United States Patent [19]

Allington

[11] 4,167,777
[45] Sep. 11, 1979

[54] SWITCHING-MODE REGULATOR

[75] Inventor: Robert W. Allington, Lincoln, Nebr.

[73] Assignee: Instrumentation Specialties Company, Lincoln, Nebr.

[21] Appl. No.: 880,809

[22] Filed: Feb. 24, 1978

[51] Int. Cl.² ............................. H02M 7/00; H02M 7/155
[52] U.S. Cl. ............................................. 363/61; 363/79
[58] Field of Search ..................... 323/24; 363/60, 61, 363/79, 85, 86, 96

[56] References Cited

U.S. PATENT DOCUMENTS

| 3,737,758 | 6/1973 | Allington | 363/86 |
| 3,890,562 | 6/1975 | West | 323/24 |

FOREIGN PATENT DOCUMENTS

2337960  2/1975  Fed. Rep. of Germany .............. 363/61

*Primary Examiner*—William M. Shoop
*Attorney, Agent, or Firm*—Vincent L. Carney

[57] ABSTRACT

An alternating current input to direct current output power supply providing a regulated constant voltage output or constant current output and incorporating a switching-mode regulating element. Regulation is primarily obtained by means of a bi-directional switching element operated at a relatively low voltage, and the alternating current voltage output from the switching element and an associated power transformer is applied to a rectifying voltage multiplier to produce a high voltage output. The voltage multiplier is subject to receiving an unbalanced potential, thereby imposing a dc off-set potential onto the switching element to cause instability in the potential at the power supply output. A correcting circuit is provided to eliminate the effect of the dc off-set potential on the switching element.

20 Claims, 7 Drawing Figures

Fig. 5

SWITCHING-MODE REGULATOR

BACKGROUND OF THE INVENTION

This invention relates to a voltage-current regulator of the switching-mode class. Generally, switching-mode regulators have the advantage of higher efficiency than series-pass or other similar regulators that use a variable power-absorbing element.

In my earlier U.S. Pat. No. 3,737,758 issued on June 5, 1973 and entitled Switching-Mode Voltage and Current Regulator, there is disclosed a regulated power supply providing a high voltage output and wherein the switching-mode regulator is a bi-directional switching element operated at a relatively low voltage. The alternating current voltage output from the switching element and an associated power transformer is applied to a rectifying voltage multiplier, i.e., a voltage quadrupler. The utilization of a voltage multiplier has the advantage of producing better stability than a non-multiplying rectifier.

This is due to the fact that in a non-multiplying rectifier the current flows through the switching means in sudden, full-current bursts and such sudden bursts of power in the feedback circuit deteriorates its stability. When a voltage multiplier is coupled to a switching-mode regulator, this stability s improved as it takes two or more halves of an alternating current half cycle for the output of switching-mode regulator and voltage multiplier combination to build up to full power. Particularly, in the voltage quadrupler illustrated in the above-mentioned patent, three halves of an alternating current half cycle are required. This is because each half cycle charges some, but not all, of the capacitors in the voltage multiplier circuit and three half cycles are required to charge all of the capacitors. The result is that the use of the voltage multiplier provides a more smooth and gradual modulation of power.

Heretofore, there has been encountered the necessity of changing the voltage quadrupler to a voltage hextupler and eliminating the post regulator transistor shown in U.S. Pat. No. 3,737,758 in order to obtain a higher output voltage and to improve the efficiency of the power supply by eliminating the most significant power-absorbing element. However, it was discovered that along with this increased output voltage there existed a new type of instability due to an unbalanced potential on the capacitors of the voltage multiplier thereby imposing a dc off-set potential onto the switching element.

Figure 1:
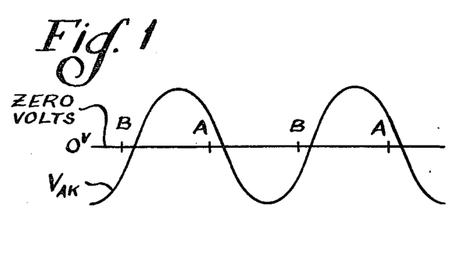
FIG. 1 is an amplitude-timing graph of the alternating current supply voltage impressed on the thyristor.
Figure 2:
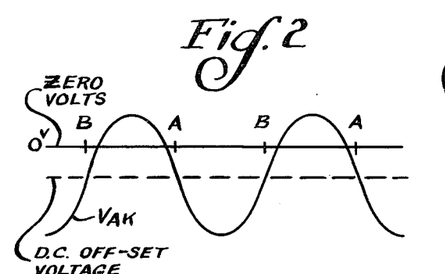
FIG. 2 is an amplitude-timing graph of the alternating current supply voltage and a negative dc off-set voltage impressed on the thyristor.
Figure 3:
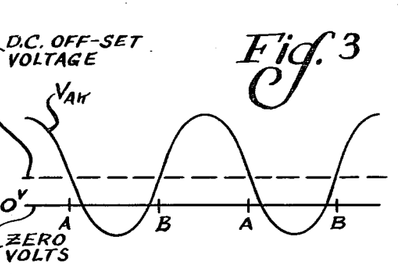
FIG. 3 is an amplitude-timing graph of the alternating current supply voltage and a positive dc off-set voltage impressed on the thyristor.
Figure 4:
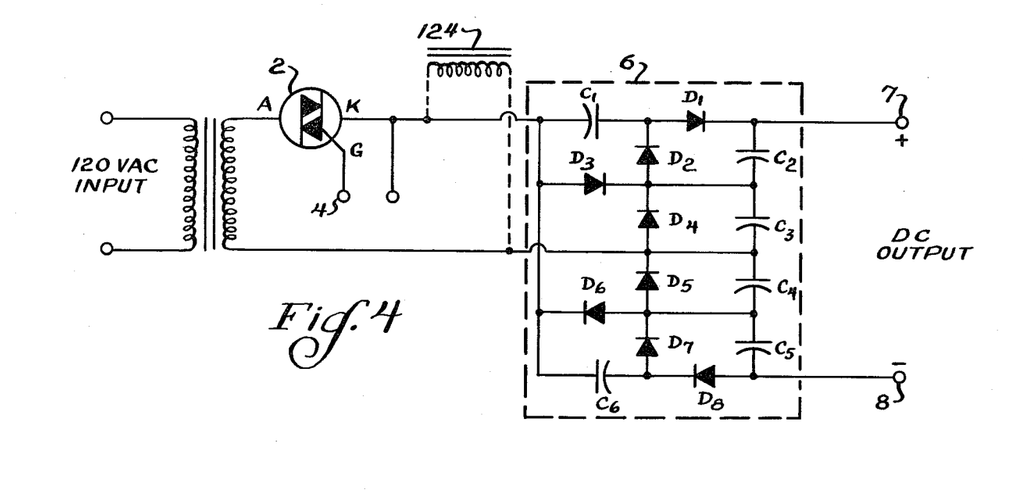
FIG. 4 is a schematic circuit diagram of one embodiment of a power supply in accordance with the invention.

This type of instability can be best understood by reference to FIGS. 1, 2, 3 and 4 of the drawings. A switching-mode power supply operating in a stable condition at a low output load level operates with an amplitude-timing graph shown in FIG. 1. A sinusoidal voltage designated by $V_{AK}$ and impressed between the anode and cathode of the switching element 2(FIG. 4) is shown with the switching element in the non-conducting state. Gating or triggering pulses appear regularly during each half cycle at successively repeating points "A" and "B". These "A" and "B" trigger pulses at the gate 4 of the switching element 2 gate or trigger it into conduction near the end of each alternating current half cycle. The instability results if the power supply, setting at a relatively low output level, is suddenly disturbed such as by initially turning on the power supply into operation after it has been off for a period of time. Under such circumstances, capacitors $C_1$ through $C_6$ in voltage multiplier 6 of FIG. 4 will all initially be completely discharged. For example, assume at initial turn-on the timing of the first trigger pulse to the switching element occurs such that the trigger pulse is near the start of a positive alternating current half cycle. If this happens the following sequence of events will take place:

1. A positive pulse from the switching element 2 charges capacitors $C_3$ and $C_6$ to a sudden high voltage, which is greater than the normal set point or operating voltage. Capacitors $C_1$ and $C_2$ do not charge because the voltage on capacitor $C_3$ opposes their charging.

2. The voltage on capacitor $C_6$ is reflected back to the switching element 2, thereby throwing a negative dc off-set voltage on its anode. A conduction path is available from capacitor $C_6$ through diode $D_8$ and through capacitors $C_4$ and $C_5$ which are not charged. During this initial turn-on transient, a similar negative voltage is reflected onto the anode of the switching element 2 from the charge on capacitor $C_3$ through a conduction path via diode $D_2$ and the uncharged capacitor $C_1$.

3. Capacitor $C_3$ partially discharges through an external load (not shown) connected across output terminals 7 and 8 with a conduction path through diodes $D_2$, $D_1$, $D_8$, $D_7$ and $D_5$. Capacitor $C_6$ also partially discharges through the load with a conduction path via diodes $D_3$, $D_2$, $D_1$ and $D_8$. The external load is not shown in FIG. 4, but may be any conventional power-consuming element that the power supply is servicing. When the output over voltage decreases to the set point level that is maintained by conventional negative-feedback circuitry (not shown), triggering or gating pulses appearing at points "A" and "B" (FIG. 1) near the end of each alternating current half cycle in the conventional way will tend to stabilize the output voltage of the power supply at the desired level. Conventionally, these trigger pulses are timed so that they occur just before the "0°" and "180°" of the sinusoidal ac wave-form of the voltage between the anode and cathode of the switching element 2. If the instability in question did not exist, these trigger pulses would be proper to initiate conduction of the switching element 2 near the end of each half cycle thereby maintaining the output voltage of the power supply at the desired level.

4. However, due to the previously mentioned dc off-set voltage on the switching element 2 reflected from the voltage on capacitor $C_6$ through the conduction path of diode $D_8$ and uncharged capacitors $C_5$ and $C_4$, the trigger pulses will not occur at the end of each positive half cycle, but will instead occur just after the start of the following negative half cycle. This result is illustrated by reference to FIG. 2. A trigger pulse at point "A" causes the switching element 2 to conduct for over one-half of the negative half cycle instead of conducting for a small portion of the positive half cycle.

5. The resulting large negative pulse charges capacitors $C_1$ and $C_4$ to a sudden high voltage, which is greater than the normal operating voltage. Capacitor $C_5$ does not charge because its charging is opposed by the voltage on capacitor $C_4$. The charging current through capacitor $C_1$ flows through diode $D_2$ and overwhelms the charge remaining on capacitor $C_3$ thus completely discharging capacitor $C_3$. The excess current is by-passed by diode $D_4$. The charge on capacitor $C_3$ is overwhelmed because its charge remaining, at the time just before the large negative pulse, had decreased from its initial value due the partial discharge through the external load.

6. The voltage on capacitor $C_1$ is reflected back to the switching element through diode $D_1$ and uncharged capacitors $C_2$ and $C_3$, thereby throwing a positive dc off-set voltage on the anode of the switching element 2.

7. Capacitors $C_4$ and $C_1$ will discharge partially through their respective diodes coupling them to the external load.

8. Thereafter, the switching element 2 is triggered into conduction at the start of a positive half cycle by a trigger pulse at point "B" (FIG. 3) because of the off-set voltage impressed upon it by the voltage on capacitor $C_1$ through diode $D_1$ and uncharged capacitors $C_3$ and $C_2$.

9. The resulting large positive pulse charges again capacitors $C_3$ and $C_6$ to a sudden high voltage. Capacitor $C_2$ does not charge because its charging is opposed by the voltage on capacitor $C_3$. The charging current through capacitor $C_6$ flows through diode $D_7$ and overwhelms the charge remaining on capacitor $C_4$, thereby completely discharging capacitor $C_4$. The excess current is by-passed by diode $D_5$.

10. Once again, the negative off-set voltage is reflected to the anode of the switching element 2 from the voltage on capacitor $C_6$ with a conduction path through diode $D_8$ and uncharged capacitors $C_4$ and $C_5$.

11. This cycle of instability now continues repeatedly and indefinitely.

In a regulated power supply made in accordance with this invention, the effect of the voltage imbalance on the capacitors is removed. This is accomplished by the provision of a dc short circuit path, such as the addition of inductor 124 shown in phantom to the circuit of FIG. 4, or modifying the timing of the gating or trigger pulses at the gate 4 of of the switching element 2 in accordance with the sign and magnitude of the unbalanced voltage on the capacitors so that triggering or gating of the switching element 2 is prevented from occurring at the conventional, normal times. The gating pulses are advanced and/or retarded so that they occur at times relative to the actual instantaneous sum of the ac supply voltage and the dc off-set voltage on the switching element 2. Thus, the switching element is not falsely gated or triggered into conduction at the beginning of a half cycle of alternating current.

SUMMARY OF THE INVENTION

A phase-controlled bi-directional thyristor is connected between a source of alternating current voltage and a rectifying voltage multiplier, the switching element or thyristor and multiplier constituting a switching-mode regulator. The output junctions of the voltage multiplier are connected to the output terminals of the power supply. The phasing or timing of the gating or triggering pulses to the thyristor are controlled firstly by negative feedback derived from the output circuitry. Correction circuitry is provided to eliminate the effect of voltage imbalance on the capacitors in the voltage multiplier. This can be done, for example, by shunting or shorting out the off-set voltage due to the imbalance or by compensating for the off-set. To compensate for the off-set, the timing of the trigger pulses is further controlled by circuitry that senses the dc off-set voltage directly between the anode and cathode of the thyristor or by circuitry that senses the voltage unbalance on the voltage multiplying capacitors. The magnitude of the dc voltage appearing at the output terminals of the power supply can be varied from zero to maximum by adjusting the magnitude of an off-set current introduced into the feedback circuit.

An object of this invention is the provision of an improved high voltage regulated power supply.

An object of this invention is the provision of a high voltage regulated power supply of the switching-mode class wherein superior stability is obtained at all output voltages and output currents from zero through the maximum available.

An object of this invention is the provision of a high voltage regulated power supply of the switching-mode class in which the use of a series-pass post regulator has been eliminated and yet adequate stability is obtained.

An object of this invention is the provision of a stable high voltage power supply of the switching-mode class that provides a higher output voltage than otherwise available, wherein a higher degree of voltage multiplication is obtained than was previously possible without introducing instability.

An object of this invention is the provision of a high voltage regulated power supply of the switching-mode class wherein the timing or appearance of trigger pulses to the switching element is controlled by means of sensing the dc voltage across the switching element as well as by conventional negative feedback means from the output circuitry.

An object of this invention is the provision of a high voltage multiplier wherein the off-set voltage on the switching element due to voltage imbalance on the multiplying capacitors is dissipated before it can cause instability.

The above-stated and other objects and advantages of the invention will become more apparent from the following detailed description when taken with the accompanying drawings. It will be understood, however, that the drawings are for purposes of illustration and are not to be construed as defining the scope of limits of the invention, reference being had for the latter purpose to the claims appended hereto.

DESCRIPTION OF THE PREFERRED EMBODIMENTS

Figure 5:
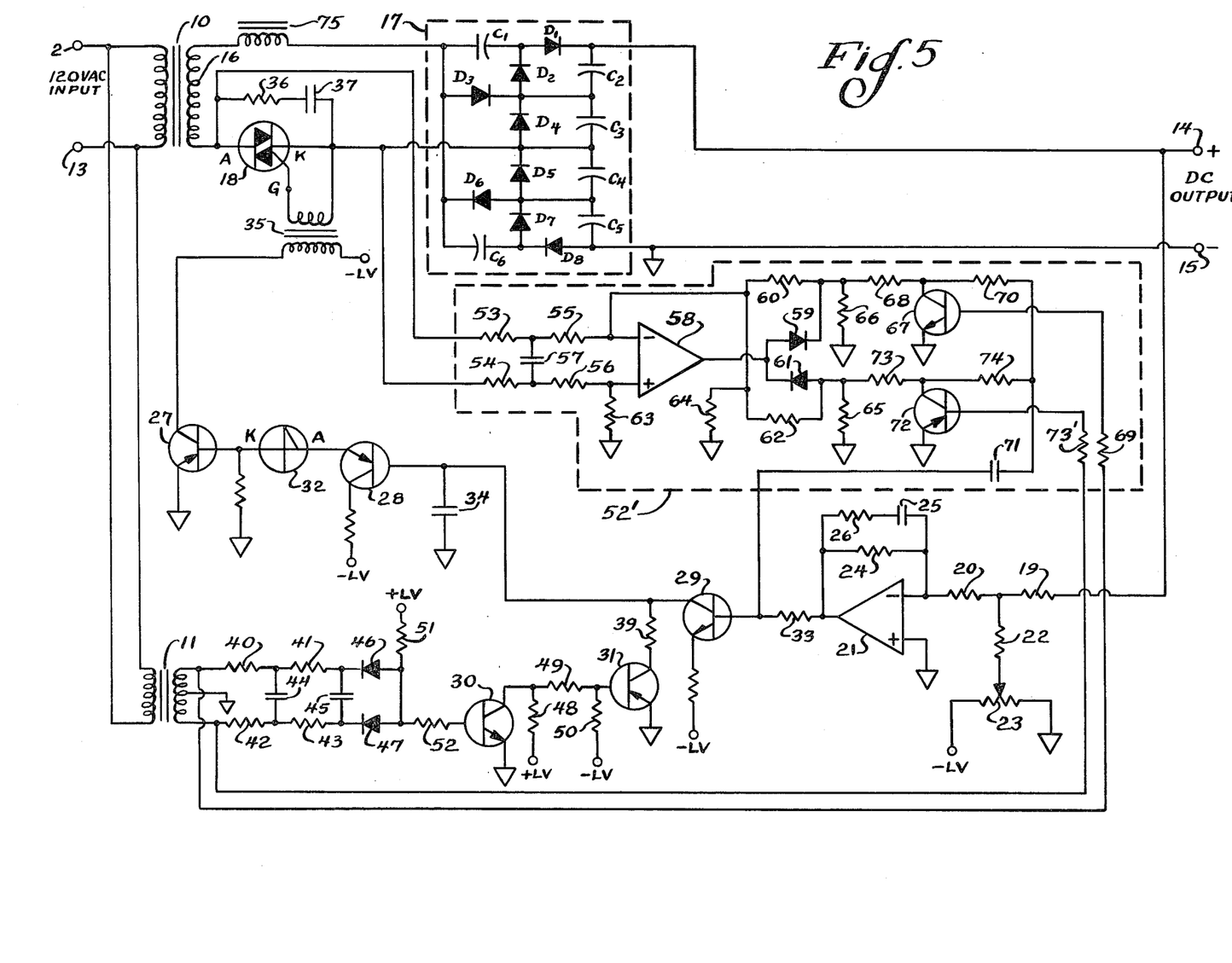
FIG. 5 is a schematic circuit diagram of a second embodiment of a power supply in accordance with the invention.

Referring now to the drawings, there is shown in FIG. 5 the primary windings of power transformers 10 and 11 which are energized by a source of alternating current voltage (120 VAC) connected to the circuit input terminals 12 and 13. The overall circuit operates to provide a regulated, constant voltage at the output terminals 14 and 15. It is here pointed out that the terminals having associated therewith the legends +LV and −LV are connected to a conventional constant voltage source of some convenient potential such as 15 volts, a potential of +15 volts above zero or common ground potential appearing at the terminals marked +LV and a potential of −15 volts below zero or common potential appearing at the terminals marked −LV. Like reference numerals have been employed throughout the drawings to designate the like parts.

The secondary winding 16 of the power transformer 10 is connected to the input junctions of the voltage multiplier 17 through a phase-controlled bi-directional thyristor 18. As shown, the voltage multiplier is a full-wave voltage hextupler, but it will be apparent that other types of voltage multipliers such as voltage octuplers, etc., can be used. One output junction of the voltage hextupler is connected to the positive output terminal 14 and the other output junction of the hextupler is connected to the negative output terminal 15 and to the circuit common.

Regulation is obtained by negative voltage feedback through coupling resistors 19 and 20 and operational amplifier 21. The voltage output of the power supply may be varied from zero to maximum by means of the off-set current supplied to the amplifier from resistor 22, which off-set current is set by the voltage developed at the wiper arm of potentiometer 23. The dc gain of the operational amplifier 21 is fixed by resistor 24. Capacitor 25 and resistor 26 are incorporated as conventional feedback stabilizing elements for the overall feedback loop of the entire power supply. The output voltage of operational amplifier 21 is used in a negative feedback manner to provide phase control of the bi-directional thyristor 18.

The phase control circuit for the bi-directional thyristor 18 incorporates transistors 27, 28, 29, 30, 31 and four-layer device 32. The collector current of current source transistor 29 is controlled by the base voltage applied to it from operational amplifier 21 through resistor 33. The collector current of the transistor 29 charges capacitor 34 in a ramp or sawtooth manner. The voltage at its emitter of the transistor 28 will follow the ramp voltage on capacitor 34 since it is an emitter follower. When this voltage exceeds the breakdown voltage of the four-layer device 32, such four-layer device will suddenly permit a pulse of current to flow, which will cause the transistor 27 to conduct, thereby allowing current to flow through pulse transformer 35 to the gate of thyristor 18 to turn it on. Resistor 36 and capacitor 37 limit the rate of rise of anode voltage of thyristor 18 at the end of each conduction cycle to prevent false retriggering of the thyristor.

At the end of each alternating current half cycle, the ramp voltage on capacitor 34 is reset to zero by the conduction of transistor 31 through resistor 39, as the transistor conducts for a short period of time at the zero cross-over points of each alternating current half cycle. Sensing of the zero cross-over points is accomplished by a pulse timing circuit consisting of a low-pass filter and the transformer 11. The low-pass filter comprises resistors 40–43 and capacitors 44 and 45 which are used to prevent spurious resetting of the capacitor 34 due to noise on the ac power supply mains. When the voltage at the secondary winding of the transformer 11 is greater than zero, the negative output of diodes 46 and 47 keeps the transistor 30 turned off. Thus, the voltage at the collector of the transistor 30 is therefore in the high state. Resistors 48, 49 and 50 are selected so that when the voltage at the collector of transistor 30 is in the high state, the voltage at the base of the transistor 31 is slightly positive, thereby keeping transistor 31 turned off. When the ac mains voltage approaches the zero cross-over point, the negative output current from the diodes 46 and 47 decreases and a positive current passing through resistor 51 turns on transistor 30 through resistor 52. As a result, the voltage at the collector of transistor 30 drops to a low state, thus turning on transistor 31 through resistor 49. This, in turn, discharges the ramp or sawtooth voltage appearing on the capacitor 34. After passing of the zero cross-over of the ac cycle, the transistor 31 turns off again and the voltage on capacitor 34 begins to ramp upwardly again.

To determine the voltage imbalance, the dc off-set voltage across the triac 18 is directly sensed by the correction circuit generally indicated as 52' in FIG. 5. Correction circuit 52' provides an ac correction signal to additionally control the input of current source transistor 29 in the phase control circuit. This correction signal alters the collector current in transistor 29 and therefore changes the voltage ramp rate on capacitor 34. Consequently, the time location of the gating pulses to thyristor 18 is controlled. On alternate half cycles the ramp rate of the voltage on capacitor 34 is advanced and retarded in a way so as to restabilize and balance the voltages on the capacitors $C_1$ through $C_6$ in the voltage hextupler circuit 17 in FIG. 5.

Assume, for example, that the voltage multiplying capacitors have unbalanced charges and there is an off-set voltage of a resulting sign and magnitude across the anode and cathode of thyristor 18. As can be seen from FIG. 2, an off-set voltage will make gating or triggering pulses to the thyristor 18 alternatingly appear too early and too late for proper operation of the thyristor. The correction circuit 52' of FIG. 5 corrects the time location of the triggering pulses appearing at the control terminal of the thyristor 18. In particular, the dc off-set voltage across the thyristor 18 is directly sensed after filtering by a low-pass filter composed of resistors 53–56 and capacitor 57. The low-pass filter is utilized to remove the spurious ac differential-mode potential, and the spurious common-mode potential (half of the dc output voltage above circuit common or circuit ground plus the ac common-mode potential from the filter) is rejected by the differential amplifier operation of the correction circuit 52' incorporating operational amplifier 58. The low-pass filtering action required by capacitor 57 and associated the resistors 53–56 need not be as thorough and efficient as it might be expected. Since this is a one-pole low-pass filter, the partially-filtered mains frequency voltage that appears at the output of amplifier 58 is 90° out of phase with the mains frequency. Since it is 90° out of phase, it has very little effect upon the advancement and retarding of the gating pulses to the thyristor 18 as the ramp rate of the voltage on capacitor 34 first is higher than normal and then is lower than normal (or vice versa) on each and every alternating current half cycle. Accordingly, errors due to poor filtration will tend to be cancelled out of the alternating current component. This is quite fortunate because heavy filtering makes the correction circuit operate in a sluggish or unstable manner.

If the anode of thyristor 18 has a positive dc potential with respect to the cathode, the output of the amplifier 58 will be negative. On the other hand, if the anode voltage has a negative dc potential, the output voltage of amplifier 58 will be positive. Assuming that the output voltage of the amplifier is positive, diode 59 will conduct and the differential gain of the amplifier is determined by resistor 60. While if the anode voltage of thyristor has a positive dc potential, the output voltage of operational amplifier 58 will be negative, thus allowing diode 61 to conduct and the differential gain is determined by resistor 62. Resistor 63 is selected to equal the sum of resistor 62 and 60 taken in parallel with resistor 64 so that the common-mode gain of the differential amplifier is approximately zero. Resistors 65 and 66 are selected to be relatively small as compared to resistors 62 and 60.

With the output voltage of amplifier 58 being positive, a positive voltage is applied to the collector of transistor 67 via diode 59 and resistor 68. The transistor 67 chops this positive voltage at the main power supply frequency rate by receiving base current from alternating current voltage on the secondary winding of transformer 11 through resistor 69. The chopped voltage is applied through resistor 70 and capacitor 71 to the base of the current source transistor 29, thus sequentially advancing and then retarding the formation of triggering pulses to thyristor 18 on successive alternating current half cycles.

With the output voltage of amplifier 58 being negative, a negative voltage is sent to the collector of transistor 72 via diode 61 and resistor 73. The transistor 72 is also connected as a dc-to-ac chopper, but its phase is the opposite of transistor 67. Specifically, the transistor 72 chops the negative voltage at the mains power supply frequency rate due to the base current from alternating current voltage on the secondary winding of transformer 11 through resistor 73'. This chopped voltage is applied through resistor 74 and the capacitor 71 to the base of transistor 29.

If the output voltage of amplifier 58 is positive, the chopping circuit output incorporating transistor 67 first advances and then retards the trigger pulses to thyristor 18 on two particular given successive half cycles. If the output voltage from amplifier 58 is negative, the chopping circuit including transistor 72 first retards and then advances the timing of trigger pulses to thyristor 18 on the same two successive alternating current half cycles. The phase of the advancing or retarding of the trigger pulses with respect to the phase of the ac voltage on the secondary winding 16 of transformer 10 is dependent on the sign of the dc off-set voltage across thyristor 18. The magnitude of the retardation or advancement of the gating pulses depends upon the magnitude of the dc off-set voltage across thyristor 18. Thus, correction circuit 52' provides an advancing signal that advances the location of alternate trigger pulses to the thyristor 18 so that trigger pulses, which should occur near the end of an alternating current half cycle, are made to occur at the end of the alternating current half cycle regardless of the off-set voltage across the thyristor and are prevented from occurring at the beginning of the next succeeding alternating current half cycle. Further, an overly large retarding signal from the output of the correction circuit 52' cannot cause false triggering at the beginning of a succeeding alternating current cycle since the reset circuit which includes resistor 39 and transistor 31 resets the ramp voltage on capacitor 34 before this time. Moreover, an advancing signal from correction circuit 52' is inherently phased in a way so as to gate the thyristor 18 at the proper times, such that the unbalanced voltage on the multiplying capacitors is smoothly brought to zero.

The inductor 75, which may be a separate inductor or may be incorporated in the leakage inductance of transformer 10, limits the maximum current flow charging the capacitors of the voltage hextupler 17 at the instant that the thyristor 18 begins to conduct. This improves the efficiency and stability of the circuit and decreases electrical disturbance signals or "EMI" into the electrical supply mains.

It will be apparent to those skilled in the art that bi-directional switching-mode devices other than the illustrated bi-directional thyristor can be used, such as a silicon-controlled rectifier connected across the dc terminals of a 4-diode bridge with the ac terminals of the bridge connected to the points "A" and "K" of FIG. 5. It is apparent that, instead of using voltage negative feedback to obtain constant voltage output, current negative feedback can be used to obtain constant current output. In addition, voltage-current product negative feedback can be used to obtain constant wattage output. It should also be apparent that various additional means can be added to the circuit to improve regulation, stability and ability to withstand overloads.

Figure 6:
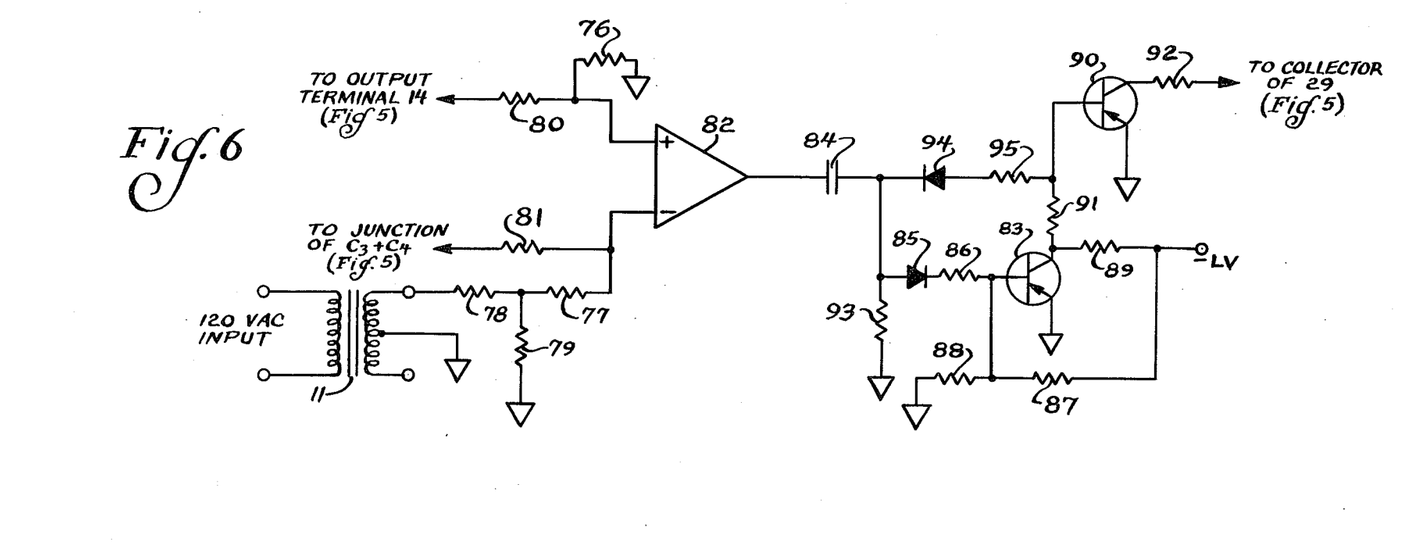
FIG. 6 is a schematic diagram of another embodiment of a power supply in accordance with the invention.

Another embodiment of the present invention is shown in FIG. 6 of the drawings. The circuit of FIG. 6 varies the timing of the resetting of the voltage on capacitor 34 rather than by varying the ramp rate of the voltage on this capacitor. The circuit of FIG. 6 is connected as noted thereon to FIG. 5 and replaces both the correcting circuit 52' and pulse timing or resetting circuit composed of resistors 40–43, 48–52; capacitors 44, 45; diodes 46, 47; and transistors 30–31. The circuit of FIG. 6 indirectly senses the dc off-set voltage on thyristor 18 by sensing the unbalance voltage on mutiplying capacitors $C_2$ through $C_5$ of hextupler 17 rather than by directly sensing the off-set voltage on thyristor 18.

In FIG. 6, assuming that resistor 76 is equal to resistor 77 in series with the parallel combination of resistors 78 and 79, resistor 80 should be equal to twice the resistance value of resistor 81. If the voltages on the voltage multiplying capacitors are in balance, the voltage above circuit common at the junction of capacitors $C_3$ and $C_4$ will be equal to one-half the voltage at the positive output terminal 14. If resistors 76 through 81 have the relationship indicated above and the capacitor voltages are in balance, the output of amplifier or differential comparator 82 will switch at exactly the ac mains zero cross-over time which appear at the secondary winding of transformer 11. Positive transistors at the output of amplifier 82 will turn off transistor 83 by current flow through capacitor 84, diode 85 and resistor 86. Transistor 83 is normally kept turned on by current flow through resistor 87 and the voltage drop across resistor 88. When transistor 83 turns off the current through resistor 89, which formerly was sunk through the transistor collector, instead turns on transistor 90 by means of current flow through resistor 91. Current flowing through resistor 92 then discharges the ramp voltage on capacitor 34 which is connected to the collector of transistor 29 on FIG. 5. The discharge pulse to the capacitor 34 lasts for a short duration because resistor 93 forms a short time constant with capacitor 84. During negative transitions of the output of amplifier 82, transistor 90 turns on, thereby discharging capacitor 84. Turning on of transistor 90 is accomplished by current flow through capacitor 84, diode 94 and resistor 95.

If the voltages on the multiplying capacitors are out of balance, the input operating point of amplifier 82 will be shifted so that output transitions of the amplifier occur at times displaced from the zero crossings of the ac mains. Discharging of the capacitor 34 (FIG. 5) will occur successively earlier than normal and then later than normal, earlier than normal and later than normal, etc., on successive alternating current half cycles. By advancing the resetting time of the ramp voltage on the capacitor 34, generation of a trigger pulse to the thyristor 18 is prevented during a half cycle in which a "late" trigger pulse would result in the thyristor 18 being gated on at the beginning of a succeeding alternating current half cycle instead of at the end of a desired alternating current half cycle.

Figure 7:
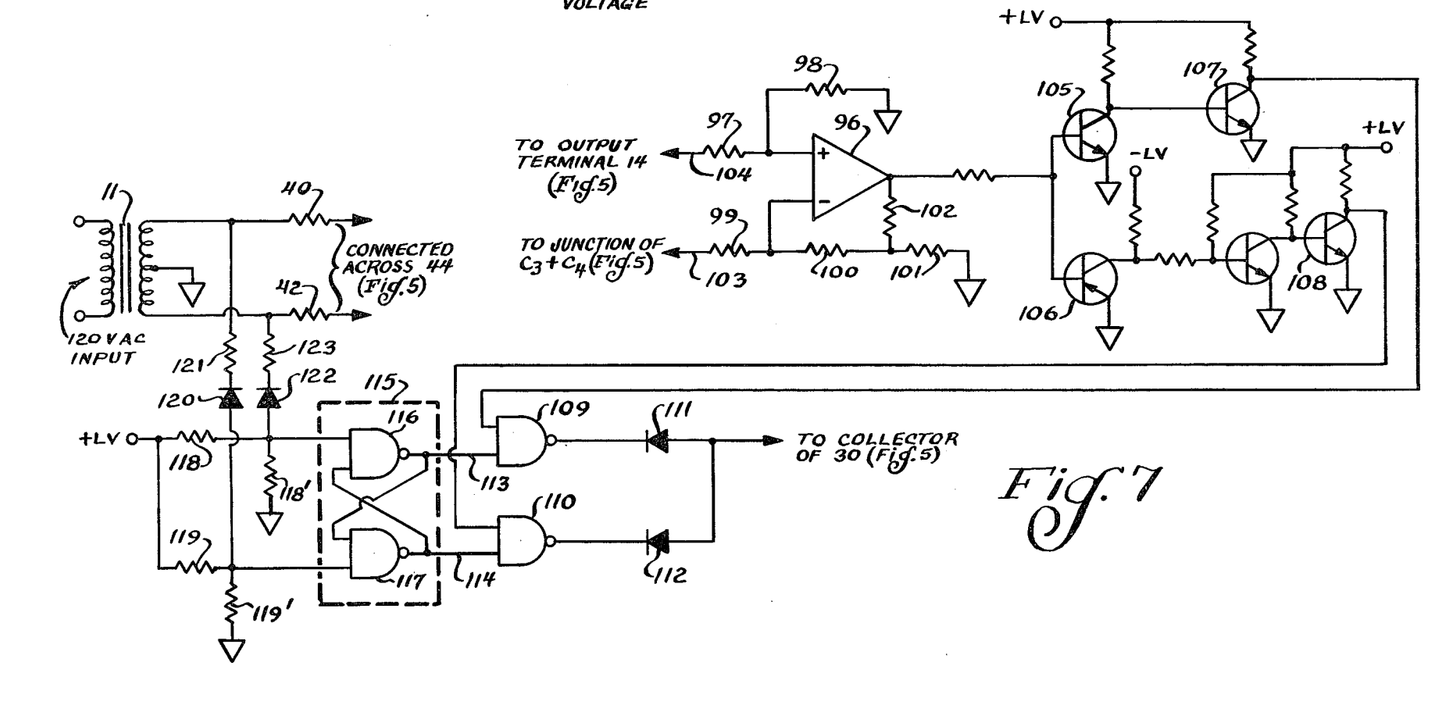
FIG. 7 is a schematic diagram of another embodiment of a power supply in accordance with the invention.

Referring now to FIG. 7, there is shown another embodiment of the present invention. The circuit of FIG. 7 replaces correction circuit 52' shown in FIG. 5. However, a portion of the pulse timing or resetting circuit consisting of transistors 30, 31 and associated resistors, diodes and capacitors is used in connection with the embodiment of FIG. 7. The circuit of FIG. 7 is connected as shown thereon to FIG. 5. The circuit of FIG. 7 also indirectly senses the dc off-set voltage on thyristor 18 by sensing directly the voltage unbalance of the multiplying capacitors $C_2$ through $C_5$ of hextupler 17. Operational amplifier 96 and resistors 97 through 102 are connected to form a differential amplfiier. Resistance values are selected so that the input signal on lead 103 connected to the resistor 99 is weighted twice as heavily as the input signal on lead 104 connected to the resistor 97. Thus, the output voltage of amplifier 96 will be zero when the voltage at the positive output terminal 14 of FIG. 5 is equal to twice the voltage at the junction of capacitors $C_3$ and $C_4$. This condition occurs only when the voltages on the multiplying capacitors are in balance. When the output voltage from amplifier 96 is zero, transistors 105 and 106 will both be turned off with resulting high collector voltages so that the collector voltages of transistors 107 and 108 will be low. These low voltages are conducted to inputs of NAND gates 109 and 110 forcing the outputs of these gates to remain in the high state. With the output voltage of both gates being high, diodes 111 and 112 cannot conduct from the collector of transistor 30 on FIG. 5 and therefore triggering of thyristor 18 takes place at the normal times.

If there is an unbalanced voltage on the multiplying capacitors, the output of amplifier 96 either becomes positive and the collector voltage of transistor 107 goes high or the output voltage from amplifier 96 goes negative and the output voltage from transistor 108 goes high. This results in the output of NAND gate 109 or 110 to be enabled so that it can shift to the low state. The other inputs via leads 113, 114 of NAND gates 109 and 110 are controlled by an R-S flip-flop 115 composed of NAND gates 116 and 117. The outputs of flip-flop 115 change states at times close to succeedingly positive and negative maxima of the ac mains voltage. Currents through resistors 118, 118', 119, and 119' prevent voltage from the secondary winding of transformer 11 from causing transitions in the outputs of the flip-flop 115 by means of current flowing through either diode 120 and resistor 121 or diode 122 and resistor 123, except at points near the maximum of each alternating current half cycle.

If the voltages across the multiplying capacitors are unbalanced in one direction, NAND gate 109 will conduct during relatively even-numbered ac half cycles resulting in turning on of transistor 31 thereby resetting the ramp voltage on capacitor 34 to zero during the last half of even-numbered half cycles. This prevents thyristor 18 from turning on just after an even-numbered half cycle due to the dc off-set voltage across it causing a trigger pulse to appear "too late". Conversely, if the unbalanced voltage on the multiplying capacitors is in the opposite direction, NAND gate 110 will go low during relatively odd-numbered alternating current half cycles resulting in the discharge of ramp voltage on capacitor 34 on the alternating current half cycles opposite from those previously mentioned. This process prevents instability due to gating of the thyristor 18 into conduction at the beginning of a succeeding alternating current half cycle. This embodiment differs from the other two embodiments in that neither trigger pulses nor reset pulses are modulated. Instead, trigger pulses to the gate of the resistor 18, which may cause instability to occur, are completely blanked out.

In FIG. 4 there is still shown another embodiment of the present invention. An inductor 124 can be incorporated into the circuit and connected as shown in FIG. 4. Any dc off-set voltage due to voltage imbalance on the multiplying capacitors of hextupler 6 is shunted around the switching element 2 by a dc current flow path through the inductor 124 so that no significant net dc off-set voltage is impressed on the bi-directional switching element 2. Any unbalanced charges on capacitors $C_1$ or $C_6$ are dissipated by this dc current flow path so the charges on the multiplying capacitors $C_2$–$C_5$ are brought into balance. It should be understood that the inductor 124 could be replaced with a resistor, if desired, as a resistor is also dc conductive element.

From the above description, it can be seen that the power supply of this invention has the advantages of operating over a wide range of output powers, of providing a higher voltage output without introducing instability and of supplying good regulation.

Although the preferred embodiments have been described with some particularity, many modifications and variations in these preferred embodiments are possible without deviating from the invention. Accordingly, it is to be understood that, within the scope of the appended claims, the invention can be practiced otherwise than as specifically described.

What is claimed is:

1. A regulated power supply of the switching mode class having power supply input means adapted to receive alternating current potential and power supply output means adapted to supply direct current electrical energy to a load, comprising:

switching means having an input terminal, a control terminal and an output terminal for blocking first portions and passing second portions of alternating half cycles of alternating current potential between the input terminal and the output terminal, the input terminal of said switching means being electrically connected to the alternating current potential;

phase-control means having an output connected to the control terminal of said switching means for increasing and decreasing said first portion relative to said second portions of alternating half cycles of alternating current potential;

negative feedback means being electrically connected between said power supply output means and an input of said phase-control means to provide a feedback signal that varies inversely proportional to a potential derived from the power supply output means;

rectifier means for rectifying said second portions of the half cycles of the alternating current potential;

voltage multiplier means having a plurality of storage devices for storing in different ones of the storage devices with additive polarity electrical potential from different second portions of the half cycles of the alternating current potential to provide a potential for application to the power supply output means;

said rectifier means and said voltage multiplier means being electrically connected between said switching means and said power supply output means;

said storage devices of said voltage multiplier means being subject to receiving an unbalanced potential thereby imposing a dc off-set potential onto said switching means to cause instability in the potential at the power supply output means; and correcting means operatively coupled between said switching means and said phase-control means to respond to the unbalanced potential and to remove the instability by eliminating the effect of the dc off-set potential on said switching means.

2. A regulated power supply of the switching-mode class having power supply input means adapted to receive alternating current potential and power supply output means adapted to supply direct current electrical energy to a load, comprising:

switching means having an input terminal, a control terminal and an output terminal for blocking first portions and passing second portions of alternating half cycles of alternating current potential between the input terminal and the output terminal, the input terminal of said switching means being electrically connected to the alternating current potential;

phase-control means having an output connected to the control terminal of said switching means for increasing and decreasing said first portion relative to said second portions of alternating half cycles of alternating current potential;

negative feedback means being electrically connected between said power supply output means and an input of said phase-control means to provide a feedback signal that varies inversely proportional to a potential derived from the power supply output means;

rectifier means for rectifying said second portions of the half cycles of the alternating current potential;

voltage multiplier means having a plurality of storage devices for storing in different ones of the storage devices with additive polarity electrical potential thereby different second portions of the half cycles of the alternating current potential to provide a potential for application to the power supply output means;

said rectifier means and said voltage multiplier means being electrically connected between said switching means and said power supply output means;

said storage devices of said voltage multiplier means being subject to receiving an unbalanced potential thereby imposing a dc off-set potential onto said switching means to cause instability in the potential at the power supply output means;

correcting means for eliminating the effect of the dc off-set potential on said switching means; and said correcting means include the means for varying control signals applied to a second input of said phase-control means so that trigger pulses at the control terminal at said switching means which should appear near the end of an alternating current half cycle are prevented from erroneously appearing during the following half cycle.

3. A regulated power supply according to claim 2 in which said varying means include means for advancing alternate ones of the trigger pulses to the control terminal of said switching means.

4. A regulated power supply according to claim 3 further comprising said advancing means having an input connected to the alternating current potential for modulating the control signals applied to the second input of said phase-control means.

5. A regulated power supply according to claim 3 in which said advancing means comprises timing means for resetting the timing of the trigger pulses.

6. A regulated power supply according to claim 2 in which said varying means comprises means for blanking the trigger pulses applied to the control terminal of said switching means.

7. A regulated power supply of the switching-mode class having power supply input means adapted to receive alternating current potential and power supply output means adapted to supply direct current electrical energy to a load, comprising:

switching means having an input terminal, a control terminal and an output terminal for blocking first portions and passing second portions of alternating half cycles of alternating current potential between the input terminal and the output terminal, the input terminal of said switching means being electrically connected to the alternating current potential;

phase-control means having an output connected to the control terminal of said switching means for increasing and decreasing said first portion relative to said second portions of alternating half cycles of alternating current potential;

negative feedback means being electrically connected between said power supply output means and an input of said phase-control means to provide a feedback signal that varies inversely proportional to a potential derived from the power supply output means;

rectifier means for rectifying said second portions of the half cycles of the alternating current potential;

voltage multiplier means having a plurality of storage devices for storing in different ones of the storage devices with additive polarity electrical potential from different second portions of the half cycles of the alternating current potential to provide a potential for application to the power supply output means;

said rectifier means and said voltage multiplier means being electrically connected between said switching means and said power supply output means;

said storage devices of said voltage multiplier means being subject to receiving an unbalanced potential thereby imposing a dc off-set potential onto said switching means to cause instability in the potential at the power supply output means;

correcting means for eliminating the effect of the dc off-set potential on said switching means; and said correcting means comprises dc conductive means for by-passing direct current from said switching means.

8. A regulated power supply of the switching mode class having power supply input means adapted to receive alternating current potential and power supply output means adapted to supply direct current electrical energy to a load, comprising:
- switching means having an input terminal, a control terminal and an output terminal for blocking first portions and passing second portions of alternating half cycles of alternating current potential between the input terminal and the output terminal, the input terminal of said switching means being electrically connected to the alternating current potential;
- phase-control means having an output connected to the control terminal of said switching means for increasing and decreasing said first portion relative to said second portions of alternating half cycles of alternating current potential;
- negative feedback means being electrically connected between said power supply output means and an input of said phase-control means to provide a feedback signal that varies inversely proportional to a potential derived from the power supply output means;
- rectifier means for rectifying said second portions of the half cycles of the alternating current potential;
- voltage multiplier means having a plurality of storage devices for storing in different ones of the storage devices with additive polarity electrical potential from different second portions of the half cycles of the alternating current potential to provide a potential for application to the power supply output means;
- said rectifier means and said voltage multiplier means being electrically connected between said switching means and said power supply output means;
- said storage devices of said voltage multiplier means being subject to receiving an unbalanced potential thereby imposing a dc off-set potential onto said switching means to cause instability in the potential at the power supply output means;
- correcting means for eliminating the effect of the dc off-set potential on said switching means; and
- said correcting means comprises dc conductive means for discharging the unbalanced potential on said storage devices.

9. A regulated power supply according to claim 7 in which said conductive means comprises an inductor.

10. A regulated power supply according to claim 9 in which said inductor is connected to the input of said voltage multiplier means.

11. A regulated power supply according to claim 8 in which said conductor means comprises an inductor.

12. A regulated power supply according to claim 3 in which said varying means further includes means for retarding the other alternate ones of the trigger pulses.

13. A regulated power supply according to claim 4 in which said varying means further includes means for retarding the other alternate ones of the trigger pulses.

14. A regulated power supply according to claim 5 in which said varying means further includes means for retarding the other alternate ones of the trigger pulses.

15. A regulated power supply according to claim 7 in which said dc conductive means comprises a dc conductive element connected across the input of said voltage multiplier means.

16. A regulated power supply according to claim 1 wherein said output means, negative feedback means, phase-control means, switching means, rectifying means, and voltage multiplier means comprises a feedback loop.

17. A regulated power supply according to claim 16 wherein said correcting means is operatively coupled to at least one point within the said feedback loop to respond to the unbalanced potential and to thereby remove the instability by eliminating the effect of the dc off-set potential on said switching means.

18. A regulated power supply having input means adapted to receive alternating current potential and output means adapted to supply direct current to a load, comprising:
- switching means electrically connected to the alternating current potential for blocking first portions and passing second portions of said alternating half cycles of said alternating current potential therethrough;
- control means electrically coupled to said switching means for increasing and decreasing said first portions relative to said second portions of alternating half cycles of alternating current potential;
- negative feedback means being electrically connected between said output means and said control means to provide a feedback signal that varies inversely proportional to a potential derived from the output means;
- rectifier means for rectifying said second portions of the half cycles of the alternating current potentials;
- multiplier means for storing electrical potential and for providing a potential for application to the output means;
- said multiplier means being subject to receiving an unbalanced potential to thereby cause an instability in the potential at the output means;
- correcting means operatively connected between said switching means and said control means to respond to the unbalanced potential, and to remove the instability in the potential at the output means.

19. The regulated power supply of claim 18 wherein said output means, negative feedback means, control means, switching means, rectifier means and multiplier means comprises a feedback loop.

20. The regulated power supply of claim 19 wherein said correcting means is operatively coupled to at least one point within the said feedback loop to respond to the unbalanced potential and to remove the instability in the potential at the output means.

* * * * *

UNITED STATES PATENT AND TRADEMARK OFFICE
CERTIFICATE OF CORRECTION

PATENT NO. : 4,167,777
DATED : September 11, 1979
INVENTOR(S) : Robert W. Allington It is certified that error appears in the above-identified patent and that said Letters Patent are hereby corrected as shown below:

Column 1, line 27, change the word "s" to "is".
Column 2, line 37, after "180°", change the left-hand quote marks to right-hand quote marks.
Column 3, line 35, omit the second appearance of the word "of".
Column 14, line 13, change the word "rectifying" to "rectifier".
Column 14, line 47, after the semicolon, add the word "and".

Signed and Sealed this

Fifth Day of February 1980

[SEAL]

Attest:

SIDNEY A. DIAMOND

Attesting Officer

Commissioner of Patents and Trademarks